Sept. 9, 1941.   E. M. SPLAINE   2,255,686
OPHTHALMIC MOUNTING
Filed Nov. 1, 1938
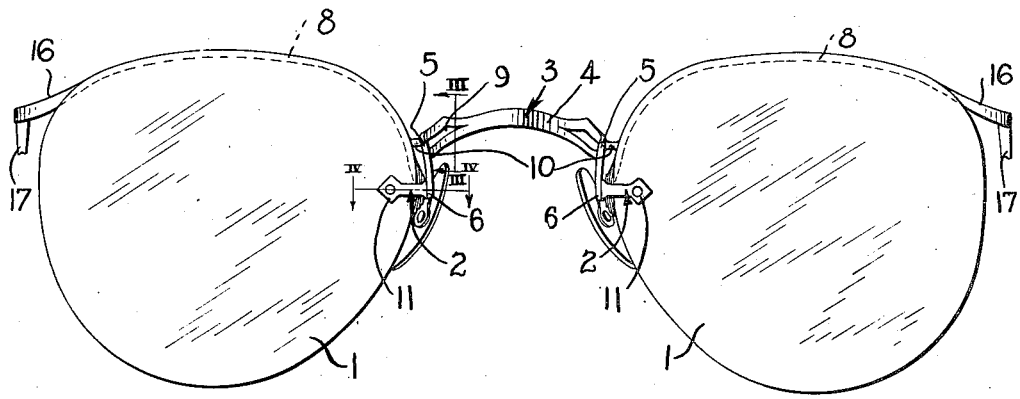
Fig. I
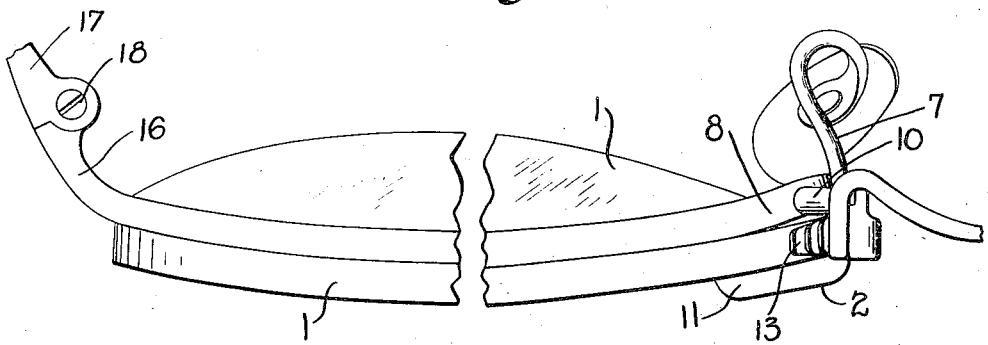
Fig. II
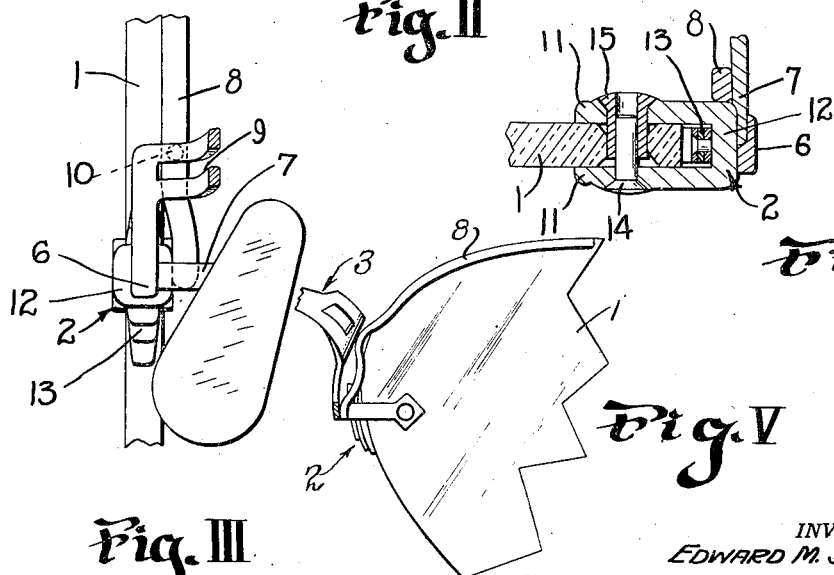
Fig. IV
Fig. V
Fig. III
INVENTOR.
EDWARD M. SPLAINE
BY Harry H. Still.
ATTORNEY Patented Sept. 9, 1941

2,255,686

UNITED STATES PATENT OFFICE 2,255,686

OPHTHALMIC MOUNTING

Edward M. Splaine, Southbridge, Mass., assignor to American Optical Company, Southbridge, Mass., a voluntary association of Massachusetts Application November 1, 1938, Serial No. 238,172

4 Claims. (Cl. 88—47)

This invention relates to improvements in ophthalmic mountings and has particular reference to a new and improved mounting.

One of the principal objects of the invention is to provide a new and improved ophthalmic mounting of the type known in the art as a semi-rimless type mounting, having temple supporting means associated therewith, which are formed to extend substantially throughout the upper contour edges of the lenses and terminating in temple connections and having means for retaining said temple supports in adjusted position and preventing accidental displacement thereof.

Another important object of the invention is to provide an ophthalmic mounting of the above character having bridge means for supporting the lenses in spaced relation with each other and relatively long and slender temple supports shaped substantially to the upper contour shape of the lenses whereby the connections between the temple supports and bridge means are greatly reinforced to increase the rigidity of the mounting at said locations.

Another object of the invention is to provide a mounting of the type set forth above employing bridge means having a resilient portion and means for reinforcing the non-resilient portions of said bridge member.

Another object of the invention is to provide an ophthalmic mounting of the above characteristics with means to resiliently relieve shock and strain thereon during use.

Other objects and advantages of the invention will become apparent from the following description taken in connection with the accompanying drawing, and it will be apparent that many changes may be made in the details of construction and arrangement of parts without departing from the spirit of the invention as expressed in the accompanying claims. I, therefore, do not wish to be limited to the exact details of construction and arrangement of parts shown and described, as the preferred form has been given by way of illustration only.

Referring to the drawing:

Fig. I is a front elevation of an ophthalmic mounting embodying the invention;

Fig. II is a fragmentary plan view of the mounting shown in Fig. I;

Fig. III is a sectional view taken on line III—III of Fig. I;

Fig. IV is a sectional view taken on line IV—IV of Fig. I, and

Fig. V is a rear elevation of an alternate structure embodying the invention.

There has recently been placed on the market an ophthalmic mounting of the semi-rimless type, that is, one having relatively long temple supports adapted to follow the contour of the upper edges of the lenses and terminating in temple connections and having their outer ends unconnected to the lenses. When the temple supports have once been adjusted to desired positional relation with the lenses, it is particularly desirable that said relation be maintained throughout the use of the mounting. It, therefore, is one of the principal objects of this invention to provide reinforcing means whereby said temple supports will be more positively retained in desired relation with the lenses and other supporting parts of the mounting after having been initially adjusted to the requirements of the wearer and during the use of the mounting.

Referring more particularly to the drawing wherein similar reference characters designate corresponding parts throughout the several views, the ophthalmic mounting embodying the invention comprises broadly a pair of lenses 1 held in aligned relation with each other by lens holding means 2 and a bar member 3.

The lens holding means 2 have portions 11 overlying the side surface of the lens and a portion 12 overlying the edge of the lens. The portion 12 is positioned in spaced relation with the edge of the lens and has a plurality of resilient members 13 secured thereto. The portions 11 are secured to the lenses 1 by screws or the like, or pin and tube means 14 and 15, joined by solder or by any desirable means known in the art, see Fig. IV.

The bridge member 3 comprises a central arch portion 4, which is usually formed so that it will be resilient and has depending portions 5 located at the opposed ends thereof and substantially in a plane normal to the plane of the lenses. The depending portions 5 are connected at their lower ends 6 to the edge portions 12 of the lens holding means 2. The lower ends 6 of the depending portions, as illustrated in Fig. IV, are so formed that suitable nose pad supporting arms 7 may be secured to the edge portion 12 of the lens holding means with a portion thereof lying beneath a portion of the said lower ends 6.

The mounting is provided with relatively long and slender temple supporting members 8 shaped substantially to follow the upper contour edges of the lenses substantially in the rear of the plane of the lenses and substantially to the curve of the inner surfaces of the lenses adjacent the upper edges thereof. The said relatively long and slender temple supports 8 may be formed relatively rigid, bendable or pliable, or resilient, or may have portions thereof provided with one or more of said characteristics. In the arrangement shown in the drawing, the upper surface of the temple supports 8 are substantially flush with the upper edges of the lenses, but it is understood that the said temple supports may be shaped to follow the upper contour edges of the lenses in the plane thereof or in front of the plane of said lenses. The said temple supports 8 are secured, as illustrated in Fig. IV, partially to the lens strap 2 and to the nose pad supporting arms 7. They progress upwardly from said points of attachment with the lens straps and nose pad supporting arms in spaced relation with the depending side portions 5 of the bridge and are shaped substantially to the shape of the upper nasal edges of the lenses, and thence progress outwardly along the upper contour edges of the lenses and terminate in rearwardly extending portions 16 to which suitable temples 17 are pivotally attached, as illustrated at 18. The various portions 2, 6, 7 and 8, adjacent the lens strap, may be joined by solder, welding or other suitable means.

It is to be understood that although the parts are shown and described as being formed separately of each other and joined to each other by solder or the like, they may be formed integral if desired, that is, all of the parts may be made integral or certain of the parts may be made separate and secured to each other by soldering, welding or the like.

It will also be understood that while the temple supports 8 are shown secured to the rear of the lens holding means 2 and to the nose pad supporting arms 7, the said temple supports may be secured only to the lens holding means, or to the nose pad supporting arms, or to other parts of the lens mounting as desired.

The bridge member 3, although being described as having a central portion 4 formed resilient, may be provided with a rigid or pliable central portion 4, or may have portions thereof rigid, pliable or resilient and may or may not have cut-out portions 9 therein, as desired. This is not only for the purpose of design, but also to decrease weight.

To reinforce the connection of the relatively long and slender temple supports 8 to the mounting and to provide a relatively rigid connection between the said temple supports and the ends of the bridge member, the said supports and bridge are joined at two spaced points adjacent the nasal sides thereof. This may be accomplished by securing the depending side portions 5, adjacent the upper ends thereof, to the adjacent portions of the relatively long temple supports 8 by pin members, studs, or the like 10 or by forming an outwardly deflected bend in the arms 8 adjacent the upper ends of the depending side portions 5 and securing the apices of the bends to said side portions at said bends. These connections of the temple supports and side portions of the bridge member may be made by soldering, welding, or the like.

This increases the rigidity of the connection between the inner ends of the relatively long temple supports and the bridge member and thereby tends to more positively support the outwardly extending portions of the relatively long temple supports in proper adjusted relation with the upper contour edges of the lenses. The pins or studs 10 will not only tend to prevent accidental displacement or movement of the temple supports 8 from their desired adjusted relation with the lenses 1, but will also reinforce the end portions 5 of the bridge 3 and thereby transmit any shock or strain occurring in any movement of the temple supports 8 to the central or resilient portion 4 of the bridge member 3, or to the resilient parts of the lens holding means 2 and will thereby tend to prevent accidental displacement or distortion of the temple supports and also obviate transmission of strain or shock to the lenses.

In practice, the temple supports 8 are formed relatively rigid so that when the temples 17 are flexed outwardly the strain of said flexing will be transmitted to the central portion 4 of the bridge member and obviate strain on the lenses.

From the foregoing, it will be seen that I have provided simple, efficient and economical means for obtaining all of the objects and advantages of the invention, namely, the provision of reinforcing means for preventing the accidental displacement of the temple supports of a semi-rimless type mounting from their desired relation with the lenses and, also, for transmitting any shock and strain received by said temple supports to the resilient parts of the mounting.

Having described my invention, I claim:

1. In lens supporting means, associated bridge means, lens holding means and temple supporting means, said temple supporting means being connected to the lens supporting means adjacent the lens holding means and adapted to extend along the upper contour edges of the lenses when in position thereon and terminating in temple connections, said lens holding means being adapted to be resiliently connected with the lenses and said bridge means comprising a resilient central portion for spanning the nose and to lie substantially in the plane of the lenses and having depending end portions connected with the lens holding means and adapted to lie substantially normal to the plane of the lenses and reinforcing means secured at their ends to the depending portions of the bridge means and to said temple supporting members at points spaced from the lens holding means to tend to prevent any accidental displacement of said temple supporting members adjacent the bridge and to provide increased rigidity at the side of the bridge for transmitting shock and strain received by said temple supporting members to said resilient portion of the bridge.

2. An ophthalmic mounting embodying a pair of lenses and lens supporting means for said lenses, said lens supporting means comprising associated bridge means, lens holding means and temple supporting means, said temple supporting means being connected to the lens supporting means adjacent the lens holding means and being shaped to extend along the upper contour edges of the lenses and terminating in temple connections, said lens holding means being adapted to be resiliently connected with the lenses, and said bridge means comprising a resilient central portion for spanning the nose and to lie substantially in the plane of the lenses and having depending end portions connected with the lens holding means and adapted to lie substantially normal to the plane of the lenses and reinforcing means between the bridge means and the temple supporting members secured to the respectively normally extending side surfaces of said depending end portions and adjacent the upper ends thereof and said lens holding means being secured to the same normally extending surfaces adjacent the lower ends of said depending end portions to tend to prevent any accidental displacement of said temple supporting members adjacent the bridge and to provide increased rigidity at the sides of the bridge for transmitting shock and strain received by said temple supporting members to said resilient portion of the bridge.

3. In lens supporting means, associated bridge means, lens holding means and temple supporting means, said temple supporting means being connected to the lens supporting structure adjacent the lens holding means and adapted to extend along the upper contour edges of the lenses when in position thereon and terminating in temple connections, said lens holding means being adapted to be connected with the lenses and said bridge means comprising a central arch portion for spanning the nose and shaped to lie substantially in the direction of the plane of the lenses and having depending end portions with side surfaces disposed substantially normal to the plane of the lenses and connected with the lens holding means and reinforcing means between the bridge means and the temple supporting members secured to the normally extending side surface of said depending end portions adjacent the upper ends thereof, and said lens holding means being secured to the same normally extending surfaces adjacent the lower ends of said depending end portions to tend to prevent any accidental displacement of said temple supporting members adjacent the bridge and to provide increased rigidity at the sides of the bridge for transmitting shock and strain received by said temple supporting members from the lenses to said central portion of the bridge to relieve said lenses from said shock and strain.

4. An ophthalmic mounting embodying a pair of lenses and lens supporting means, said lens supporting means comprising associated bridge means, lens holding means and temple supporting means, said temple supporting means being connected to the lens supporting structure adjacent the lens holding means and adapted to extend along the upper contour edges of the lenses and terminating in temple connections, said lens holding means being connected with the lenses and said bridge means comprising a central arch portion for spanning the nose and shaped to lie substantially in the direction of the plane of the lenses and having depending end portions with side surfaces disposed substantially normal to the plane of the lenses and connected with the lens holding means and reinforcing means between the bridge means and the temple supporting members secured to the normally extending side surface of said depending end portions adjacent the upper ends thereof and said lens holding means being secured to the same normally extending surfaces adjacent the lower ends of said depending end portions to tend to prevent any accidental displacement of said temple supporting members adjacent the bridge and to provide increased rigidity at the sides of the bridge for transmitting shock and strain received by said temple supporting members from the lenses to said central portion of the bridge to relieve said lenses from said shock and strain.

EDWARD M. SPLAINE.